United States Patent
Düpjan et al.

(10) Patent No.: US 11,324,975 B2
(45) Date of Patent: May 10, 2022

(54) BREATHING TUBE FOR A RESPIRATOR AND RESPIRATOR

(71) Applicant: Dräger Safety AG & Co. KGaA, Lübeck (DE)

(72) Inventors: Matthias Düpjan, Lübeck (DE); Christian Ulbrich, Hamburg (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 205 days.

(21) Appl. No.: 16/227,650

(22) Filed: Dec. 20, 2018

(65) Prior Publication Data

US 2019/0192885 A1   Jun. 27, 2019

(30) Foreign Application Priority Data

Dec. 21, 2017   (DE) ...................... 10 2017 011 934.1

(51) Int. Cl.
| | |
|---|---|
| *A62B 9/00* | (2006.01) |
| *A62B 7/02* | (2006.01) |
| *F16L 37/084* | (2006.01) |
| *A62B 18/02* | (2006.01) |
| *A62B 9/04* | (2006.01) |

(52) U.S. Cl.
CPC ................. *A62B 9/00* (2013.01); *A62B 7/02* (2013.01); *F16L 37/084* (2013.01); *A62B 9/04* (2013.01); *A62B 18/02* (2013.01)

(58) Field of Classification Search
CPC .... A62B 9/00; A62B 9/04; A62B 7/02; A62B 7/00; A62B 18/02; A62B 18/08; A61M 16/06; A61M 16/0875; Y10T 403/31; Y10T 403/315; F16L 37/0985; F16L 37/098; F16L 37/084; F16L 33/227; F16L 19/02
USPC .... 285/903, 308, 317, 319, 305; 128/202.27
See application file for complete search history.

(56) References Cited

U.S. PATENT DOCUMENTS

| | | | |
|---|---|---|---|
| 2,073,335 A | 3/1937 | Connell | |
| 4,214,779 A * | 7/1980 | Losell | ................... A61M 39/04 285/319 |
| 4,606,559 A * | 8/1986 | Rammelsberg | ......... F16L 21/08 285/39 |

(Continued)

FOREIGN PATENT DOCUMENTS

| | | |
|---|---|---|
| AU | 2014/201737 A1 | 4/2014 |
| CN | 101815557 A | 8/2010 |

(Continued)

*Primary Examiner* — Justine R Yu
*Assistant Examiner* — Kelsey E Baller
(74) *Attorney, Agent, or Firm* — McGlew and Tuttle, P.C.

(57) ABSTRACT

A breathing tube (1), for a respirator (2), includes a flexible tube body (3) with a tube axis (4), with a first tube end (5) and with a second tube end (6). A molding (7) is formed at the first tube end (5). The molding (7) extends at least partially along the tube axis (4) away from the first tube end (5) of the tube body (3). A respirator (2) may be provided, including the breathing tube (1), a breathing unit (14) and a breathing air supply device (15). A breathing tube port (16) is formed at each of the breathing unit (14) and at the breathing air supply device (15) for connecting the breathing tube (1). A mounting device (17) is formed at at least one breathing tube port (16) for mounting the molding (7) of the breathing tube (1).

19 Claims, 4 Drawing Sheets

(56) References Cited

U.S. PATENT DOCUMENTS

| | | | | |
|---|---|---|---|---|
| 4,786,085 | A | * | 11/1988 | Sauer ................. F16L 37/0985 285/24 |
| 5,316,350 | A | * | 5/1994 | Kollenbrandt ........ A61M 16/08 285/242 |
| 5,794,986 | A | * | 8/1998 | Gansel .............. A61M 16/0816 285/148.16 |
| 5,937,851 | A | * | 8/1999 | Serowski .............. A61M 16/06 128/202.27 |
| 6,279,573 | B1 | | 8/2001 | Johnson et al. |
| 6,595,214 | B1 | * | 7/2003 | Hecker ................ A61M 16/06 128/206.21 |
| 8,485,193 | B2 | * | 7/2013 | Worley ............ A61M 16/0488 128/207.14 |
| 9,868,001 | B2 | * | 1/2018 | Walker .................. A62B 18/10 |
| 2003/0034651 | A1 | * | 2/2003 | Neubauer .............. F16L 11/111 285/396 |
| 2004/0239001 | A1 | | 12/2004 | Edirisuriya et al. |
| 2007/0181132 | A1 | | 8/2007 | Worley |
| 2010/0059057 | A1 | * | 3/2010 | Tapppehoon ......... A61M 39/10 128/204.18 |
| 2013/0333701 | A1 | | 12/2013 | Herron |
| 2014/0053939 | A1 | | 2/2014 | Kaye et al. |

FOREIGN PATENT DOCUMENTS

| | | |
|---|---|---|
| CN | 204709585 U | 10/2015 |
| CN | 210138364 U | 3/2020 |
| DE | 17 33 602 U | 11/1956 |
| DE | 19 09 892 U | 2/1965 |
| GB | 933172 A | 8/1963 |
| GB | 1 381 951 A | 1/1975 |
| WO | 2013/089690 A1 | 6/2013 |

\* cited by examiner

BREATHING TUBE FOR A RESPIRATOR AND RESPIRATOR

CROSS REFERENCE TO RELATED APPLICATIONS

This application claims the benefit of priority under 35 U.S.C. § 119 of German Application 10 2017 011 934.1, filed Dec. 21, 2017, the entire contents of which are incorporated herein by reference.

TECHNICAL FIELD

The present invention pertains to a breathing tube for a respirator, especially for a closed-circuit breathing apparatus (also known by the acronym CCBA). The present invention further pertains to a respirator with such a breathing tube.

BACKGROUND

Freely portable respirators, in which a breathing unit, e.g., a breathing mask covering the mouth or the face, is coupled in a fluid-communicating manner with a portable breathing air supply device, e.g., a compressed air cylinder, an air filter device, an air-cooling device or the like by means of a flexible breathing tube, are known. Breathing tubes usually have a flexible configuration in order to guarantee a flexible, fluid-communicating coupling of the breathing unit with the breathing air supply device. Relative motions of the breathing unit and the breathing air supply device are thus possible in the coupled state, as a result of which handling as well as comfort of use are improved. Two types of portable respirators are essentially distinguished, namely, container-type devices and regeneration-type devices.

Container-type devices usually have a breathing tube, via which the breathing air supply device is coupled with the breathing unit in a fluid-communicating manner. During inhalation, breathing air is inhaled from the breathing air supply device via the breathing tube and the breathing unit. The breathing air supply device often has essentially only a filter or a compressed air cylinder. For exhalation, conventional breathing units have a first valve, which blocks exhalation to the breathing air supply device, and a second valve, via which the exhaled air can be released from the breathing unit into the surrounding area. The first valve and the second valve are often integrated in a device called demand oxygen system. As an alternative, the first valve and the second valve may be arranged at spaced locations from one another at a breathing unit configured as a face mask.

Regeneration-type devices are also called closed-circuit devices or closed-circuit respirators (CCBAs). In closed-circuit respirators, the breathing air supply device is usually coupled with the breathing unit via at least two breathing tubes, which are separate from one another. Breathing air provided by the breathing air supply device is fed to the breathing unit via a first breathing tube. A first valve, which is arranged, for example, at a breathing tube port of the breathing unit for connecting the first breathing tube, makes possible an air flow in the direction of the breathing unit and prevents an air flow back to the first breathing tube. Exhaled air is fed again to the breathing air supply device for processing via a second breathing tube. A second valve, which is arranged, for example, at a breathing tube port of the breathing unit for connecting the second breathing tube, makes possible an air flow in the direction of the breathing air supply device and prevents an air flow back to the breathing unit. Conventional breathing air supply devices of closed-circuit respirators have a $CO_2$ filter for binding $CO_2$ from the exhaled air, a circulating device for facilitating the inhalation and exhalation as well as a compressed air cylinder for storing oxygen for enriching the breathing air with oxygen. In addition, cooling devices may be provided for cooling the breathing air, in order to reduce the health risk of the user, especially in case of more prolonged operations in hot environments and to improve the comfort of the closed-circuit breathing apparatus.

To ensure sufficient maintenance, especially cleaning, disinfection, drying or the like, breathing tubes are coupled detachably with the breathing unit as well as with the breathing air supply device via tube fastenings. Two different types of tube fastenings, namely, a direct fastening of the breathing tube or fastening by means of a coupling adapter, are known, in principle.

In case of direct fastening of the breathing tube, a free end of the breathing tube can be moved to a port area of the breathing unit or the breathing air supply device and can be fixed by means of a union nut. The drawback of mounting the breathing tube is that the breathing tube must be aligned precisely with the port area. Moreover, port areas often have a slightly conical configuration, so that especially the removal of the breathing tube and port area is greatly difficult. Another difficulty is due to the fact that it is difficult to grip behind the mounted breathing tube, so that a force to be applied for pulling off can only be transmitted to the breathing tube with difficulty. In addition, it is especially difficult to remove comparatively soft breathing tubes, because these may easily twist or become narrow. Finally, it is especially important during mounting that the breathing tube be aligned correctly with the port area in a preferential position, because, e.g., the orientation of the breathing unit with the breathing tube may be influenced by the alignment. Pulling forces or torques, which considerably reduce the wearing comfort and accelerate the wear of the breathing tube due to torsion, may act on the breathing unit due to a disadvantageous alignment. Such an alignment is often carried out by eyeballing on the basis of mold release marks or additionally applied marks. Moreover, these marks often can be seen with difficulty only at best, especially under poor visibility conditions.

In case of fastening by means of a coupling adapter, a usually rigid coupling adapter is arranged at a free end of the flexible breathing tube and is fixed by means of a fixing device, e.g., a cable binder, a tube clamp, integrations or the like. The coupling adapter can be moved to a port area of the breathing unit or the breathing air supply device and fixed, for example, by means of a screw connection, a locking connection or the like. Coupling adapters have the drawback that residual contaminants, moisture and germs may be left behind in partition lines between the breathing tube and the coupling adapter even in case of regular cleaning and disinfection. This leads to increased risk in terms of hygiene for the user of the respirator.

SUMMARY

Based on this state of the art, a basic object of the present invention is to provide a breathing tube for a respirator, especially for a closed-circuit breathing apparatus, as well as a respirator, which are free or at least partially free from these drawbacks. An object of the present invention is, in particular, to provide a breathing tube for a respirator as well as a respirator with such a breathing tube, which breathing tube improves the connection of the breathing tube to a respirator and/or the separation of the breathing tube from the respirator and/or the cleaning of the breathing tube in a simple as well as cost-effective manner and also guarantee reliable connection of the breathing tube to the respirator.

Accordingly, the object is accomplished by a breathing tube for a respirator, which breathing tube has the features according to the invention, and by a respirator having features according to the invention.

According to a first aspect of the present invention, a breathing tube is provided for a respirator, especially for a closed-circuit breathing apparatus. The breathing tube has a flexible tube body with a tube axis, with a first tube end and with a second tube end. A molding (a molded portion) is formed at the first tube end of the breathing tube. The molding extends at least partially along the tube axis away from the first tube end of the tube body.

The tube body of the breathing tube is preferably configured with a helical or ring-shaped corrugation according to a corrugated tube or a bellows-type tube. In case of ring-shaped corrugation, the tube body has sections with different diameters, especially external diameters, which recur at preferably regular distance, along the tube axis. The tube body preferably has a round or at least essentially round cross-sectional area. In particular, an inner wall of the tube body has a flat topology in relation to an outer wall of the tube body. The inner wall is preferably also smooth. Provisions may be made for a metal spring, a metal coil, a metal ring or the like to be arranged in the areas with larger external diameters in order to improve the intrinsic stability of the breathing tube and to improve the elastic spring-back of a deflected breathing tube to an original shape. The breathing tube is defined on both sides by the first tube end and the second tube end, the first tube end and the second tube end being defined according to the present invention as end areas of the tube body. Provisions may be made for a tube wall to be thicker at the first tube end and/or at the second tube end than in the other areas of the tube body.

At least one molding is arranged at least at the first tube end. The molding extends at least partially along the tube axis away from the tube body. Provisions may accordingly be made for the molding to extend parallel to the tube axis or obliquely to the tube axis, the molding preferably moving away from the tube axis in case of extension in the oblique direction. In case of extension in an oblique direction, the molding has an axial extension component and a radial extension component. The molding preferably has a thickness that corresponds or at least essentially corresponds to a thickness of the first tube end. The molding preferably has a flexible, especially rubber-elastic configuration.

A breathing tube according to the present invention for a respirator has the advantage over conventional breathing tubes for respirators that an additional handling point is provided by moldings with simple means as well as in a cost-effective manner. In the mounted state, for example, with the union nut removed, the molding can be grasped substantially better than the first tube end, so that a force necessary for removal can be better transmitted to the tube. In addition, the molding has the advantage that it can be used to align the breathing tube at a breathing tube port for connecting the breathing tube. Moreover, tightening of the union nut can be prevented by means of the molding in a positive-locking manner if the breathing tube is not arranged correctly at the breathing tube port. The mounting and removal of the breathing tube according to the present invention are thus considerably improved compared to conventional breathing tubes.

According to a preferred variant of the present invention, provisions may be made in a breathing tube for a molding to be formed at the second tube end, wherein the molding extends at least partially along the tube axis away from the second tube end of the tube body. The breathing tube thus has a molding at the first tube end and at the second tube end. These moldings may have an identical or at least similar configuration or have different shapes. Mutually different moldings have the advantage that a user is better able to recognize whether a tube end is configured for coupling with a breathing unit or with a breathing air supply device. A molding at the second tube end has the advantage that the mounting and removal of the breathing tube according to the present invention are further improved.

The molding preferably has a first section connected to the tube body and a second section connected to the first section at an angle, the second section extending pointing away from the tube axis. The first section preferably extends parallel or at least essentially parallel to the tube axis. A second section bent at an angle in such a manner has the advantage that the molding extends away from tube axis and can thus be grasped by a user more easily. The mounting and removal of the breathing tube are thus improved with simple means as well as in a cost-effective manner.

An obtuse angle is preferably formed on a side of the molding facing away from the tube axis between the first section and the second section. The obtuse angle is preferably between 100° and 160°, especially preferably between 120° and 140° and especially preferably about 130°. Such an obtuse angle has the advantage that the second section can easily be grasped and, moreover, it reduces the risk of the second section preventing the fixation of a union nut. The mounting and removal of the breathing tube are thus improved with simple means as well as in a cost-effective manner.

Further, the molding preferably has a strap-like configuration, namely a strap-shaped or tab-shaped configuration. A strap-shaped/tab-shaped configuration is defined within the framework of the present invention as a shape with a small thickness relative to the width, wherein the length may correspond to the width and is preferably greater than the width. A strap-shaped molding has the advantage that it can be grasped especially advantageously by the user, especially with two fingers. The mounting and removal of the breathing tube are thus improved with simple means as well as in a cost-effective manner.

The molding preferably has a slip blocking device, also referred to herein as an anti-slip grip or grip enhancing device. The anti-slip grip (slip blocking device) has, for example, a fluting, nubs or the like. The anti-slip grip is preferably formed on the second section. The fingers can advantageously be prevented by the anti-slip grip from slipping off from the molding when pulling forces are introduced. The mounting and removal of the breathing tube are thus improved with simple means as well as in a cost-effective manner.

A plurality of moldings, which are arranged at mutually spaced locations in the circumferential direction of the breathing tube, are also preferably formed at the first tube end and/or at the second tube end. The moldings are preferably located at uniformly spaced locations from one another. The first tube end and/or the second tube end preferably have two moldings, which are located at spaced locations from one another by 180° in the circumferential direction of the tube body. A plurality of moldings, especially two moldings per tube end (paired moldings), have the advantage that the breathing tube can be better grasped by the user. Due to the distribution by 180° in the circumferential direction, torque-free mounting as well as removal of the breathing tube are improved. The mounting and removal of the breathing tube are thus improved with simple means as well as in a cost-effective manner.

It is preferred in a breathing tube according to the present invention that the molding is formed monolithically with the tube body. This may be as an integral structure. The molding preferably has the same material as the tube body. Such a breathing tube can be manufactured with simple means as well as in a cost-effective manner. Moreover, a monolithic configuration has the advantage that the molding has an especially good connection to the tube body and especially high pulling forces can thus be transmitted via the molding to the tube body. The risk of the molding being torn off from the tube body is reduced in this manner.

It is preferred that a rounded transition area is formed between the molding and the tube body. The rounding is formed preferably in a plane in which the molding, which is especially strap-shaped, extends. Notch effects between the molding and the tube body can be reduced by means of the rounding, so that stress peaks can be reduced in the tube body in an advantageous manner as well as with simple means. In addition, the molding has an improved connection to the tube body due to the rounding, so that especially strong pulling forces can be transmitted to the tube body via the molding. The risk of the molding being torn off from the tube body is reduced in this manner.

Provisions may be made according to the present invention for a conical end area to be formed at the first tube end and/or at the second tube end of the tube body, the conical end area expanding outwardly. In other words, at least one tube end of the breathing tube is expanded conically such that an internal diameter of the tube body increases towards the tube end. A conical end area has the advantage that it becomes easier to move the breathing tube to the breathing tube port. Further, improved sealing effect can be achieved here, and a tensioning force can be brought about by the conical end area between the breathing tube and the breathing tube port. The mounting of the breathing tube as well as the tightness of the fluid-communicating coupling of the breathing tube with the breathing tube port are improved with simple means as well as in a cost-effective manner.

The first tube end and/or the second tube end preferably have a closing ring. The closing ring is preferably made of solid material and contributes to the increase in the durability of the breathing tube, especially in the connection of the molding to the body. In addition, secure coupling of the breathing tube with the breathing tube port can be improved by the closing ring. Pulling forces can be transmitted especially advantageously via the closing ring from the molding to the tube body. The closing ring is preferably configured as an abutment for the union nut for holding the breathing tube. The closing ring preferably also has a flexible, especially rubber-elastic configuration, so that the fixation of the union nut is improved.

According to a second aspect of the present invention, the object is accomplished by a respirator, especially a closed-circuit breathing apparatus. The respirator has a breathing tube according to the present invention, a breathing unit and a breathing air supply device. A breathing tube port each is formed on the breathing unit and the breathing air supply device for connecting the breathing tube. A mounting device is formed at at least one breathing tube port for mounting the molding of the breathing tube. The respirator preferably has a union nut for fixing the breathing tube at the breathing tube port.

The respirator is preferably configured as a closed-circuit breathing apparatus. The respirator accordingly has preferably two breathing tubes, which do not communicate fluidically with one another and are especially separate from one another. Two breathing tube ports each are thus formed at the breathing unit and at the breathing air supply device for connecting a respective breathing tube. The breathing air supply device preferably has a filter device, especially a $CO_2$ filter device for binding $CO_2$ from the breathing air and/or a cooling device for cooling the breathing air and/or an oxygen storage device for adding oxygen to the breathing air and/or a blower device for circulating the breathing air. The breathing unit preferably has a face mask covering the face or a mouth mask covering the mouth or a mouthpiece. Breathing air can be sent, especially pumped, from the breathing air supply device to the breathing unit via a breathing tube in order to be inhaled there by the user. Exhaled breathing air can be sent back to the breathing air supply device via the other breathing tube and it can again be processed by said device.

A mounting device is formed at at least one breathing tube port for mounting the molding of the breathing tube. The mount preferably extends along the tube axis from a free end of the breathing tube port over at least a partial section of the breathing tube port. The mount thus has dimensions that allow the mounting of the molding. The mount is configured, in particular, for mounting the molding or at least a partial section of the molding in a positive-locking manner. Correct alignment of the breathing tube in relation to the breathing tube port is thus facilitated. It is preferred in this connection that the mounting device has a width that corresponds to the width of the molding or is at least slightly larger in order to make it possible or make it easier to insert the molding into the mounting device. The mount is preferably configured such that the molding can be sunk at least partially in the mount, so that the molding does not hinder the union nut of the respirator according to the present invention during the screw connection.

The respirator according to the present invention has the same advantages as those already described above concerning the breathing tube according to the present invention. Accordingly, an additional handling point is provided in the respirator according to the present invention by the molding with simple means as well as in a cost-effective manner. In the mounted state, for example, with the union nut removed, the molding can be grasped substantially better than the first tube end, so that a force necessary for the removal can be better transmitted to the breathing tube. In addition, a molding has the advantage that it can be used to align the breathing tube at the breathing tube port for connecting the breathing tube. Moreover, tightening of the union nut can be prevented by means of the molding if the breathing tube is not arranged correctly at the breathing tube port. If the breathing tube is mounted correctly, the mounting device prevents the molding from hindering the union nut during tightening. The mounting and removal of the breathing tube are thus considerably improved in the respirator according to the present invention compared to conventional respirators.

According to a preferred embodiment of the present invention, the mounting device has lateral limiting walls for aligning the molding at the mounting device. The limiting walls preferably have a distance from one another that corresponds to the width of the molding or is slightly larger. Lateral limiting walls have the advantage that the alignment of the molding at the mounting device is improved with simple means as well as in a cost-effective manner.

It is preferred that a lateral limiting wall has an interruption for passing through a locking tooth of a union nut of the respirator. Provisions may be made for a locking device, which blocks an accidental slipping off of the locking tooth from the interruption into the mounting device, to be arranged at the interruption. The interruption and the mounting device are preferably arranged and configured such that if the breathing tube is mounted correctly, the molding is arranged in the mounting device such that the interruption is released for mounting the locking tooth.

The breathing tube port preferably has a stop wall for limiting the breathing tube during the mounting at the breathing tube wall, said stop wall having an external diameter that is larger than an internal diameter of the breathing tube, and the stop wall being interrupted by the mounting device. The width of the interruption preferably corresponds to the width of a locking tooth of the union nut. The width of the interruption preferably also corresponds to the width of the mounting device. The stop wall preferably has a circumferential or essentially circumferential configuration. Maximum overlap of the breathing tube and the breathing tube port can be set by means of the stop wall. Moreover, the stop wall offers an abutment for the union nut for fixing the breathing tube at the breathing tube port. Further, the stop wall may be used as an abutment during the removal of the breathing tube. The interruption of the stop wall makes it, furthermore, possible to pass through the molding into the mounting device. The mounting and removal of the breathing tube are improved by means of the stop wall with simple means as well as in a cost-effective manner.

It is further preferred that the at least one breathing tube port has a conical closing area as well as a ring-shaped recess, the conical closing area tapering towards a free end of the at least one breathing tube port and the recess being arranged adjacent to the conical closing area such that the conical area is arranged between the free end and the recess. The recess is preferably configured to receive the closing ring of the breathing tube. A conical closing area has the advantage that the fluid-tight coupling between the breathing tube and the breathing tube port can be improved with simple means as well as in a cost-effective manner.

Further aspects and improvements provided by the present invention appear from the following description of some exemplary embodiments of the present invention, which are shown in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, elements having the same function and mode of operation are always designated by the same reference numbers in FIGS. 1 through 4.

Figure 1:
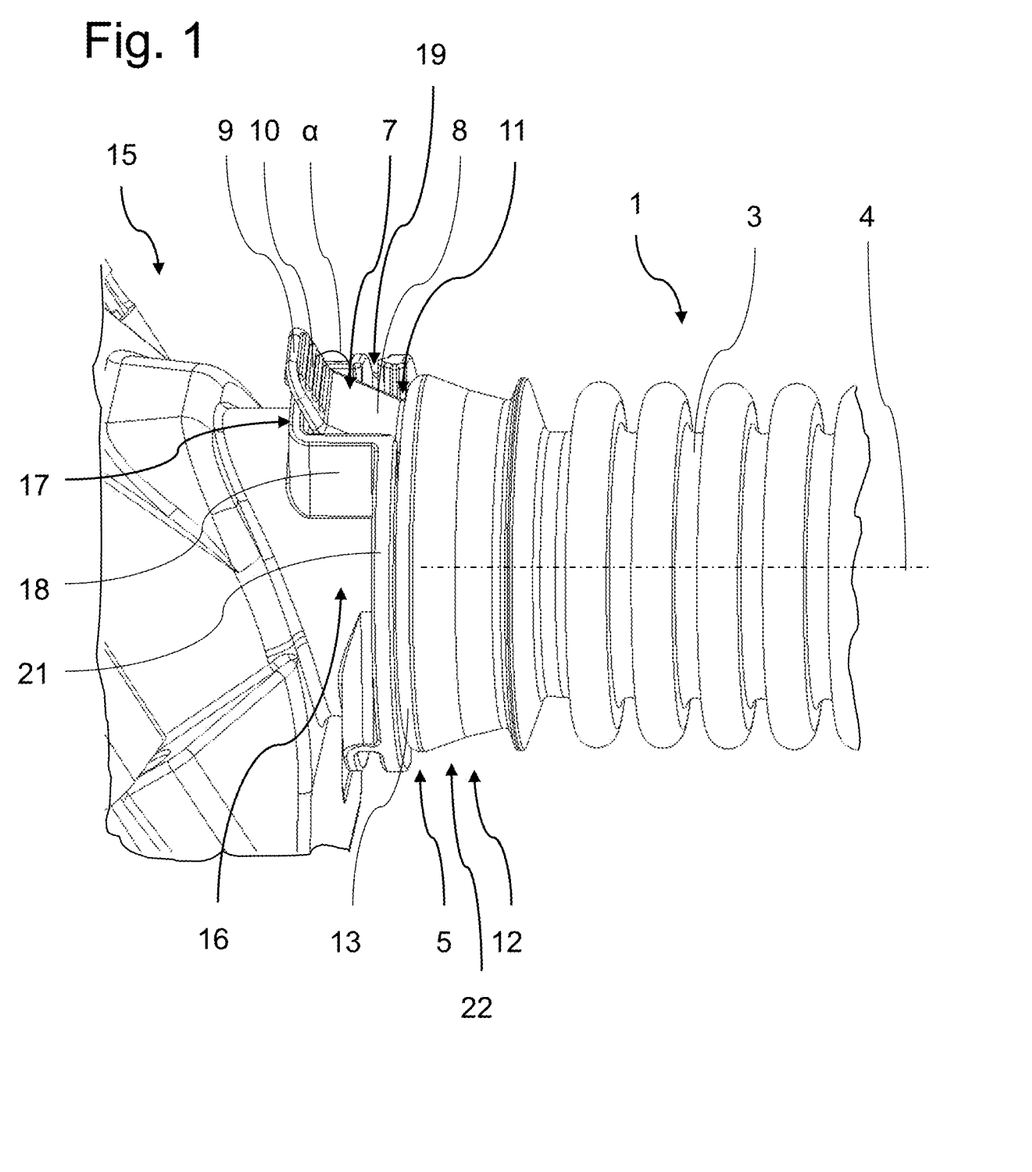
FIG. 1 is a lateral perspective showing a detail of a preferred embodiment of a breathing tube according to the present invention, which embodiment is arranged at a breathing tube port.

FIG. 1 schematically shows in a lateral view a detail of a preferred embodiment of a breathing tube 1 according to the present invention, which is arranged at a breathing tube port 16. The breathing tube 1 has a tube body 3, which extends along a tube axis 4. A conical end area 12, which expands towards the first tube end 5, is arranged at a first tube end 5 of the breathing tube 1. The first tube end 5 of the breathing tube 1 has a closing ring 13, preferably one made of a solid material, especially rubber. A strap configuration molding 7, which extends along the tube axis 4 away from the tube body 3, is arranged at the closing ring 13. The molding 7 has a first section 8 connected to the closing ring 13 as well as a second section 9 arranged at an end of the first section 8, which end faces away from the closing ring 13. An obtuse angle α is formed between the first section 8 and the second section 9. An anti-slip grip 10 having fluting is arranged on the second section 9 on both sides in order to prevent slipping off when pulling on the section 9. A transition area 11 between a narrow lateral surface of the first section 8 and the closing ring 13 has a rounding to reduce notch effects.

The breathing tube 1 is arranged at a breathing tube port 16 of a breathing air supply device 15. The breathing tube port 16 has a stop wall 21, which defines a mounting direction of the breathing tube 1. The breathing tube 1 is in contact with the stop wall 21 and is thus mounted completely on the breathing tube port 16. A mounting device 17 is arranged at the stop wall 21 for mounting the molding 7 of the breathing tube, so that the stop wall 21 is interrupted in the area of the mounting device 17 and the mounting device 17 is thus open pointing towards the breathing tube 1. The first section 8 of the molding 7 is arranged in the mounting device 17. The mounting device 17 is defined laterally by lateral limiting walls 18, so that the breathing tube 1 is aligned by means of the molding 7 and the mounting device 17 relative to the breathing tube port 16 and hence relative to the breathing air supply device 15. The breathing tube port 16 has a conical closing area 22, which is hidden in this view and is hidden by the conical end area 12 of the breathing tube. In a lateral limiting wall 18, which is a rear wall in this view, an interruption 19 is formed for inserting a locking tooth 25 of a union nut 20, shown in FIG. 2. The union nut 20 can be mounted in this mounted state of the breathing tube 1. If the breathing tube 1 is not mounted correctly, the union nut 20 is blocked by the molding 7, so that the nut cannot be tightened.

Figure 2:
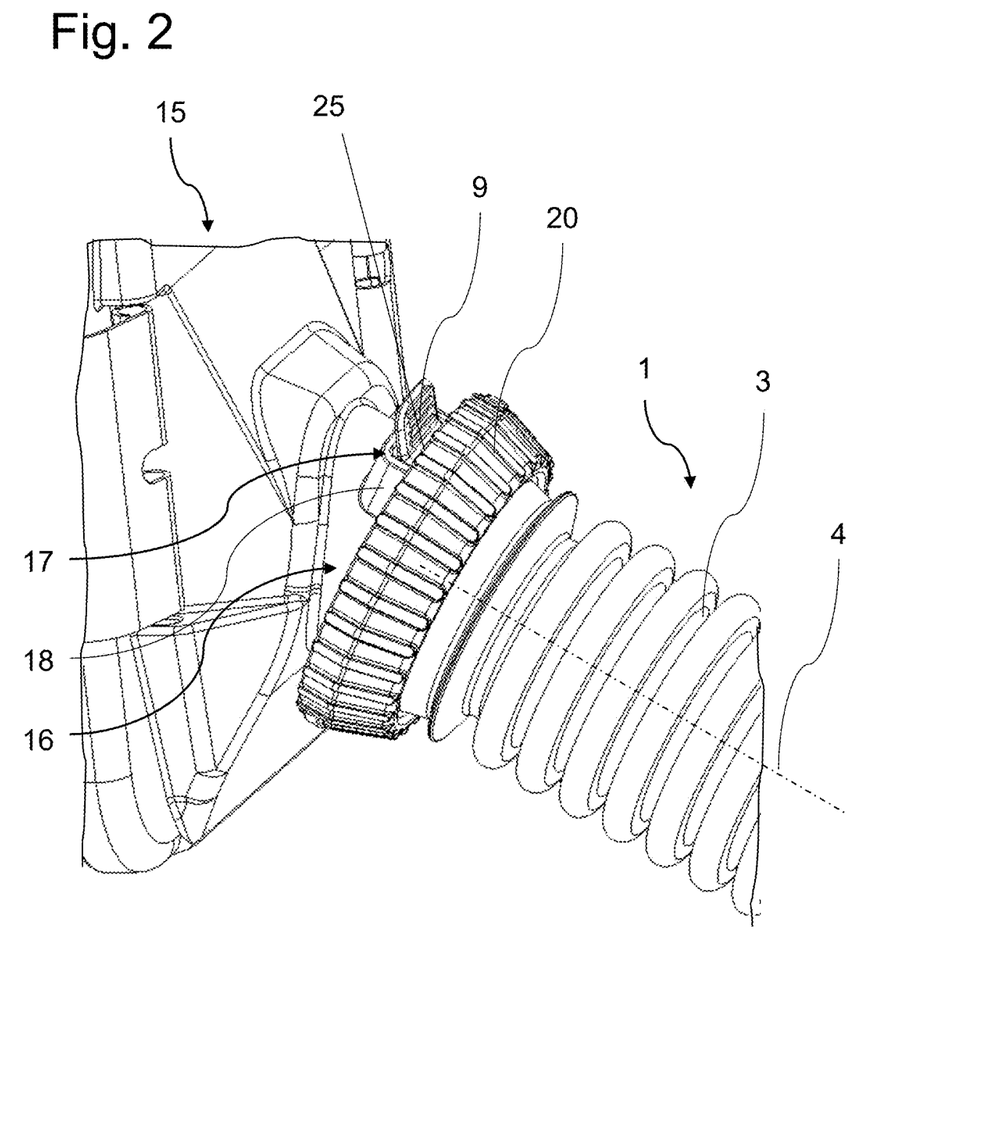
FIG. 2 is a perspective view of the detail of the breathing tube from FIG. 1, which is arranged at the breathing tube port.

FIG. 2 schematically shows the detail of the breathing tube 1 from FIG. 1, which is arranged at the breathing tube port 16 in a perspective view. The breathing tube 1 is secured in this view at the breathing tube port 16 of the breathing air supply device 15 by means of the union nut 20. A hidden locking tooth of the union nut 20 meshes in this state with the interruption 19 shown in FIG. 1 and is supported against the stop wall 21. The first section 8 of the molding 7 is hidden by the union nut 20. The second section 9 of the molding 7 projects from the mounting device 17.

Figure 3:
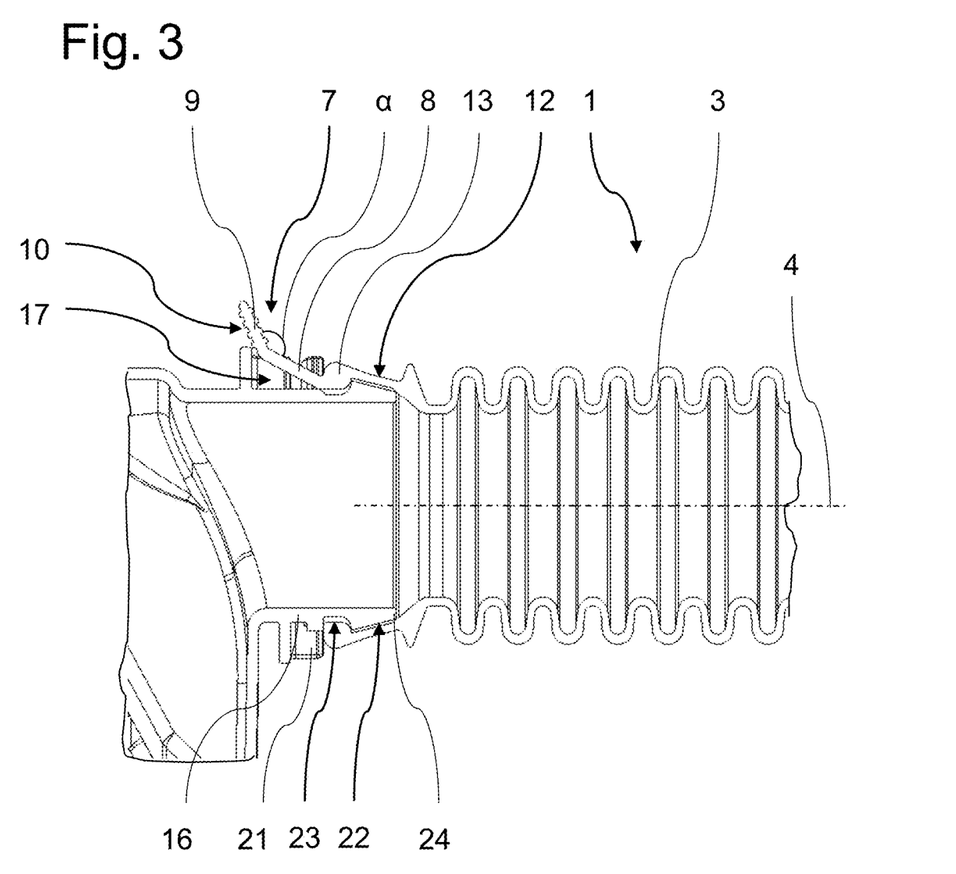
FIG. 3 is a sectional view of the detail of the breathing tube from FIG. 1, which is arranged at the breathing tube port.

FIG. 3 schematically shows the detail of the breathing tube 1 from FIG. 1, which is arranged at the breathing tube port 16, in a sectional view. It can be clearly seen in this view that the conical end area 12 of the breathing tube 1 circumferentially covers the conical closing area 22 of the breathing tube port 16. The closing ring 13 of the breathing tube 1 is arranged in a circumferential recess 23 and is flush in contact with the stop wall 21 of the breathing tube port 16. The conical closing area 22 is defined by the circumferential recess 23 and a free end 24 of the breathing tube port 16 on both sides. The first section 8 of the molding 7 is arranged in the mounting device 17. The second section 9 of the molding 7 projects from the mounting device 17. In this exemplary embodiment, the second section 9 has an anti-slip grip 10 on both sides. In addition, it can be seen that the breathing tube 1 is configured as a corrugated or bellows-type tube and has a tube body 3 with a corrugated longitudinal section.

Figure 4:
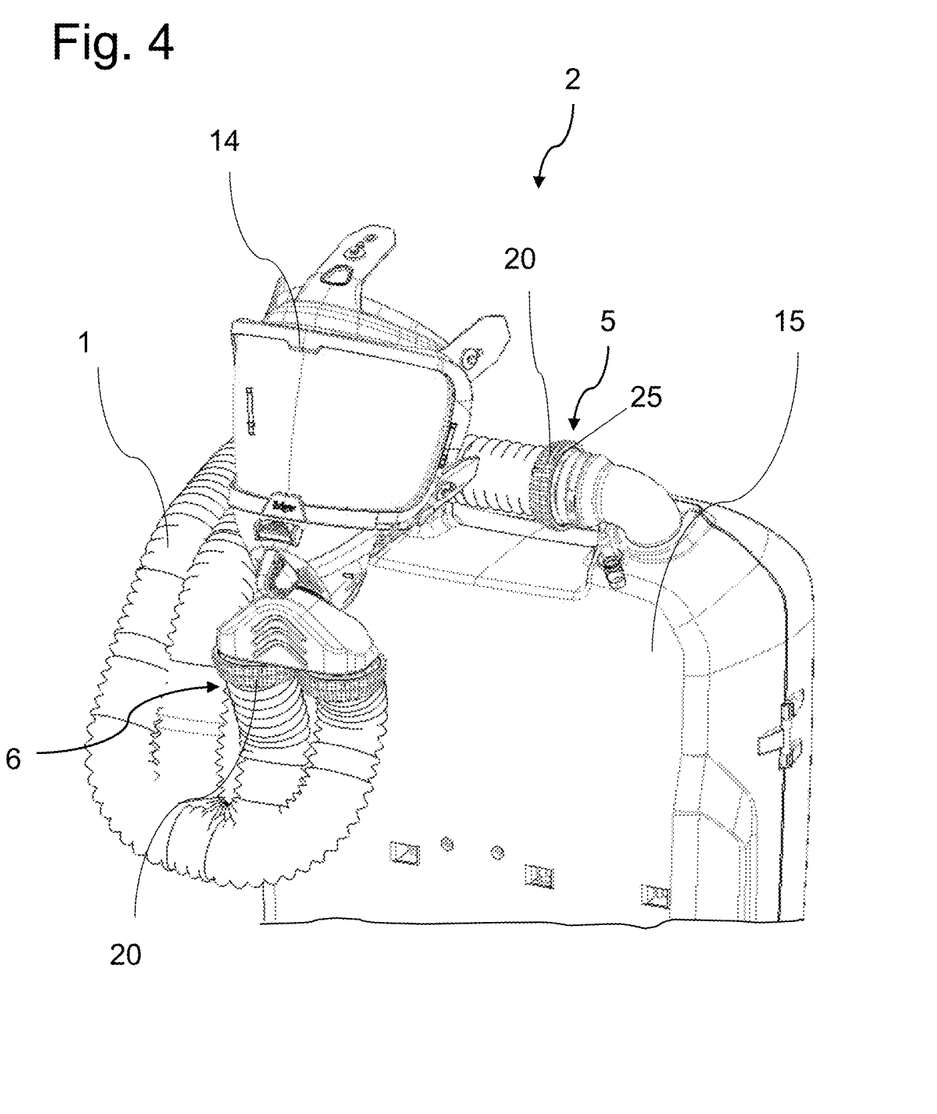
FIG. 4 is a perspective view of a preferred embodiment of a respirator according to the present invention.

FIG. 4 schematically shows a preferred embodiment of a respirator 2 according to the present invention in a perspective view. The respirator 2 is configured as a closed-circuit breathing apparatus and has a portable breathing air supply device 15 as well as a breathing unit 14, which are coupled with one another in a fluid-communicating manner via breathing tubes 1 such that a closed breathing circuit can be obtained. First tube ends 5 of the breathing tubes 1 are arranged at the breathing air supply device 15 and are secured each by means of a union nut 20. Second tube ends 6 of the breathing tubes 1 are arranged at the breathing unit 14 and are secured by means of a respective union nut 20.

While specific embodiments of the invention have been shown and described in detail to illustrate the application of the principles of the invention, it will be understood that the invention may be embodied otherwise without departing from such principles.

APPENDIX

| | List of reference designations: |
|---|---|
| 1 | Breathing tube |
| 2 | Respirator |
| 3 | Tube body |
| 4 | Tube axis |
| 5 | First tube end |
| 6 | Second tube end |
| 7 | Molding |
| 8 | First section |
| 9 | Second section |
| 10 | Slip blocking |
| 11 | Transition area |
| 12 | Conical end area |
| 13 | Closing ring |
| 14 | Breathing unit |
| 15 | Breathing air supply device |
| 16 | Breathing tube port |
| 17 | Mounting device |
| 18 | Lateral limiting wall |
| 19 | Interruption |
| 20 | Union nut |
| 21 | Stop wall |
| 22 | Conical closing area |
| 23 | Recess |
| 24 | Free end |
| α | Angle |

What is claimed is:

1. A breathing tube for a respirator, the breathing tube comprising:
a flexible tube body comprising a first tube end and a second tube end, the flexible tube body having a tube axis;
a molding integrally connected to the first tube end to form a one-piece breathing tube structure, the molding extending at least partially along a direction of the tube axis away from the first tube end of the tube body, the molding having an inner surface defining a conical end area extending three-hundred and sixty degrees about the tube axis, at least a portion of the molding extending axially beyond the conical end area with respect to the tube axis, each outer portion of the molding and each outer portion of the flexible tube body defining an outermost peripheral surface of the one-piece breathing tube structure, the outermost peripheral surface extending continuously from one end of the one-piece breathing tube structure to another end of the one-piece breathing tube structure; and the molding has a strap-shaped configuration.

2. A breathing tube in accordance with claim 1, further comprising another molding formed at the second tube end, the another molding extending at least partially along a direction of the tube axis away from the second tube end of the tube body.

3. A breathing tube in accordance with claim 1, wherein the molding comprises a first section connected to the tube body and a second section connected at an angle to the first section, the second section extending in a direction pointing away from the tube axis, wherein each outer portion of the flexible tube body is located outside of an interior space of the molding, the conical end area extending three-hundred and sixty degrees about the tube axis.

4. A breathing tube in accordance with claim 3, wherein an obtuse angle is formed between the first section and the second section on a side of the molding facing away from the tube axis.

5. A breathing tube in accordance with claim 1, wherein the molding has an anti-slip grip.

6. A breathing tube in accordance with claim 1, further comprising a paired molding to provide a plurality of moldings, which are arranged at spaced locations from one another in the circumferential direction of the breathing tube, at the first tube end.

7. A breathing tube in accordance with claim 2, further comprising a second tube end paired molding to provide a plurality of moldings, which are arranged at spaced locations from one another in the circumferential direction of the breathing tube, at the second tube end.

8. A breathing tube in accordance with claim 1, wherein the molding is configured monolithically with the tube body.

9. A breathing tube in accordance with claim 1, wherein a rounded transition area is formed between the molding and the tube body.

10. A breathing tube in accordance with claim 1, wherein the conical end area is formed in a region of the first tube end of the tube body, the conical end area being expanded outwardly in a direction toward the first tube end.

11. A breathing tube in accordance with claim 2, wherein the conical end area is formed in a region of the second tube end of the tube body, the conical end area being expanded outwardly in a direction toward the second tube end.

12. A breathing tube in accordance with claim 1, further comprising a closing ring at the first tube end.

13. A respirator comprising:
a breathing unit with a breathing unit tube port;
a breathing air supply device with a breathing air supply device tube port, at least one of the breathing unit tube port at the breathing unit and the breathing air supply device tube port at the breathing air supply device comprising a mounting device;
a breathing tube connected to the breathing tube port at the breathing unit and connected to the breathing tube air supply device port at the breathing air supply device, the breathing tube comprising:

a flexible tube body comprising a first tube end and a second tube end, the flexible tube body having a tube axis;

a flexible strap molding formed at a circumference of the first tube end, the molding extending obliquely away from the tube axis away at the first tube end of the tube body, the molding being mounted to the mounting device, the mounting device receiving at least a portion of the flexible strap molding, the mounting device comprising lateral limiting walls configured to align the flexible strap molding within the mounting device, the first tube end defining a conical end area extending three-hundred and sixty degrees about the tube axis.

14. A respirator in accordance with claim 13, wherein the mounting device comprises a first lateral limiting wall and a second lateral limiting wall, the first lateral limiting wall and the second lateral limiting wall defining a recess, the portion of the flexible strap molding being arranged in the recess.

15. A respirator in accordance with claim 14, wherein one of the first lateral limiting wall and the second lateral limiting wall comprises an interruption for passing through a locking tooth of a union nut of the respirator.

16. A respirator in accordance with claim 13, wherein:
the breathing tube port at the breathing air supply device has a stop wall configured to limit the breathing tube during mounting on the breathing air supply device tube port at the breathing air supply device;
the stop wall comprises an external diameter that is larger than an internal diameter of the breathing tube; and
the stop wall is interrupted by the mounting device.

17. A respirator in accordance with claim 13, wherein:
the breathing air supply device tube port at the breathing air supply device has a conical closing area and a ring-shaped recess;
the conical closing area tapers towards a free end of the at least one breathing tube port;
the recess is arranged adjacent to the conical closing area such that the conical closing area is arranged between the free end and the recess;
the mounting device comprises a plurality of lateral walls and a mounting device wall extending between the lateral walls;
the lateral walls and the mounting device wall define a mounting device recess.

18. A respirator in accordance with claim 13, wherein the breathing tube further comprises another molding formed at the second tube end, the another molding extending at least partially along a direction of the tube axis away from the second tube end of the tube body.

19. A respirator in accordance with claim 13, wherein the breathing tube further comprises a paired molding to provide a plurality of moldings, which are arranged at spaced locations from one another in the circumferential direction of the breathing tube, at the first tube end.

* * * * *